3,052,629
Patented Sept. 4, 1962

3,052,629
GLASS MOLD LUBRICANT
Andrew Stanley Morrow, Kinnelon Borough, N.J., and Arthur G. Brewer and Milton Alfred Torbin, Pittsburgh, Pa., assignors to Shell Oil Company, New York, N.Y., a corporation of Delaware
No Drawing. Filed Apr. 12, 1960, Ser. No. 21,615
11 Claims. (Cl. 252—29)

This invention relates to improved glass lubricants. Conventional glass mold lubricants such as a mineral oil base containing graphite are not entirely satisfactory because they tend to discolor the glass, permit sticking of the glass to the mold and cause damage due to improper lubrication of the molding equipment. Also, oil base lubricants used for this purpose cause undesirable smoke and present a fire hazard.

It is an object of this invention to provide an improved glass mold lubricant. Another object is to provide a glass lubricant which is fire-resistant and does not smoke. Still another object is to provide a glass lubricant which is multifunctional and can be used in the glass art as a mold lubricant, shear lubricant, parting lubricant, and general lubricant for entire glass machines.

These and other objects are accomplished in accordance with this invention by a mineral oil base concentrate containing two particular types of dissimilar non-ionic surface active agents, a non-abrasive lubricant solid which is non-combustible at elevated temperatures and possesses lubricating and anti-frictional properties, and a water-soluble corrosion inhibitor, and a stable, fire-resistant water-in-oil emulsion thereof with a relatively large proportion of water.

The mineral oil base is preferably one having a viscosity index (Dean-Davis) of at least 80, preferably at least 90. Suitable mineral oil fractions may be obtained from paraffinic, naphthenic or mixed base crudes. The oil base should also have a viscosity in the range, generally from 35 at 100° F. to 100 SUS at 210° F., preferably between 40 and 150 SUS at 100° F., particularly useful mineral oil base is a high viscosity index refined mineral lubricating oil having the following properties:

| | |
|---|---|
| Gr., API°, 60° C. | 32.2 |
| Color, ASTM | 1 |
| Pour point, ° F. | 5 |
| Flash, ° F., COC | 370 |
| Fire, ° F. | 435 |
| Viscosity, SUS at 100° F. | 103 |
| Viscosity index | 93 |
| Neutralization No. | 0.01 |

The two non-ionic surface agents which are added to the mineral oil are (1) a monoester of a long chain fatty acid having at least 8 carbon atoms and an alkitan and (2) a polyalkylenoxy phenoxy alkanol. Each of these additives may be present each in amounts of from 0.5% to 10%, but preferably such that the monoester (1) is used in amounts ranging from 1% to 4%, preferably from 1.5% to 3% and the polyalkylenoxy phenoxy alkanol (2) is used in amounts ranging from 0.5% to 3%, preferably from 1% to 2%.

The alkitans are partially dehydrated polyhydric alcohols being inner ether polyhydric compounds having 1 or 2 ethers and 4 to 6 hydroxyl groups in the molecule. Compounds of this type are exemplified by sorbitan, mannitan, xylitan, dulcitan, etc. Fatty acids which are used to form the monoesters of alkitans are saturated and unsaturated fatty acids having at least 8 carbon atoms, preferably from 12 to 18 carbon atoms, such as lauric, stearic, oleic, linoleic, riconoleic acids and the like. Monoesters of this type include sorbitan monolaurate, sorbitan monostearate, sorbitan monooleate, sorbitan monoricinoleate, mannitan monolaurate, mannitan monooleate, and mixtures thereof.

The second essential additive is an oil-soluble alkyl phenoxy polyalkylene glycol having the formula

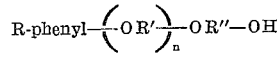

wherein $n$ is an integer of from 2 to 6, preferably 3 to 4, R is an alkyl radical of 4 to 20 carbon atoms, preferably 4 to 12, and R' and R" are the same or different alkylene groups such as ethylene or propylene groups, they are preferably the same, and preferably ethylene. Compounds of this type are $C_{4-12}$ alkyl phenoxy(alkoxy)$_{4-6}$ alkanols exemplified by isobutylphenoxy tetraethyleneoxy ethanol, diisobutylphenoxy tetraethyleneoxy ethanol, nonylphenoxy tetraethyleneoxy ethanol, octylphenoxy hexaethyleneoxy ethanol, diisobutylphenoxy tripropyleneoxy propanol, and mixtures thereof.

The non-abrasive solid lubricant, which is added to the oil base in amounts of from about 0.1% to about 5%, preferably from about .5% to about 1% by weight, includes various carbon blacks, flake and colloidal graphites, mica, talc, vermiculite, polymeric silicones, sugar and mixtures of these materials with borax, metal oxides, such as lead or titanium oxide and the like.

The corrosion inhibitor is preferably a water-soluble compound such as water-soluble inorganic metal (Na or K) nitrites, nitrates, chromates, phosphates or their amine derivatives or water-soluble low molecular weight salts such as amine or alkali metal or alkaline earth metal (amine or hydroxylamine, Na, K, Ca, Ba) acetate, propionate. Some compounds of this type may function as liquid or vapor phase corrosion inhibitors and include sodium nitrite, sodium chromate, sodium polyphosphate, hydroxypropylamine nitrite, diisopropylammonium nitrite, dicyclohexylammonium nitrite, calcium acetate, calcium nitrite and mixtures thereof such as sodium and calcium acetate or sodium nitrite and hydroxypropylamine nitrite and the like. The corrosion inhibitors are added to the oil or water phase of the emulsion, generally as aqueous solutions in amounts of from about 0.001% to about 1% and are kept in suspension in the oil by the non-ionic agents ar other types of suspending agents such as soaps, sulfonates, quaternary ammonium salts, sulfonated fatty acid amides, and the like.

In addition to the above essential additives it is preferred to use in such compositions small amounts of from about 0.01% to about 2%, preferably from about 0.2% to about 1% of oil-soluble anti-oxidants and anti-wear agents. The anti-oxidants include phenolic and aromatic amine compounds. The phenolic compounds are illustrated by the alkyl phenols, e.g., di- and trialkyl phenols, for instance 2,4-, 2,2-, 3,4, 2,6- and 3,5-diamyl phenol, 2,4-dimethyl-6-tert-butylphenol, 2,6-ditert-butyl-4-methylphenol, 2,6-ditert-butyl-4-methylol phenol, 4,4'-methylene-bis(2,6-ditert-butylphenol). The amines are illustrated by arylamines such as phenyl-alpha-naphthylamine or phenyl-beta-naphthylamine. The anti-wear agents include organic sulfides such as dibenzyl disulfide or other sulfur-containing compounds such as chloronaphtha methylxanthate, fatty acids, e.g., oleic acid and esters thereof such as glycerol monooleate.

Illustrative examples of mineral oil base of this invention emulsified with from about 20% to about 45%, preferably from about 30% to about 40% of water, to form stable glass lubricants are presented below:

*Composition A*

A 50 gallon batch of spray glass lubricant was prepared by adding to 30 gallons of a mineral lubricating oil (VI 93, viscosity at 100° F., SUS 103), 2% by weight sorbitan monooleate, 1% weight diisobutylphenoxy (ethoxy)₄ ethanol, 32 ounces (0.7%) by weight of colloidal graphite and 4 ounces (0.1%) by weight of sodium nitrite in water solution. To this mixture was added 20 gallons of water while stirring constantly and air blowing to form a stable water-in-oil emulsion which was excellent as a glass spray lubricant. The lubricant may also be used with excellent results in shear glob cutting of molten glass and as a glass mold lubricant, causing no smoking, sticking or damage to the equipment or the glass being worked.

Composition B

A 50 gallon batch of glass spray lubricant was prepared by adding to 30 gallons of a mineral lubricating oil (viscosity at 100° F. SUS 40), 2% by weight sorbitan monooleate and 1% by weight diisobutylphenoxy (ethoxy)₄ ethanol, 0.2% weight 2,6-di-tert-butyl-4-methylphenol, 0.1% by weight phenyl-alpha-naphthylamine, 0.5% by weight colloidal graphite and 0.1% sodium nitrite. To this oil mixture was added 20 gallons of water as in Composition A to form a non-sticking glass lubricant applicable as a spray or mold lubricant.

Other oil base concentrates which can be diluted with from 20% to 40% water to form a good water-in-oil glass lubricant include:

Composition C

Sorbitan monooleate, 1.5% by weight; nonylphenoxy-(ethoxy)₂ ethanol, 1% by weight; 4,4'-methylene(2,6-di-tert-butylphenol), 0.2% by weight; phenyl-alpha-naphthylamine, 0.1% by weight; colloidal graphite, 0.3% by weight; $NaNO_2$, 0.1% by weight; mineral lubricating oil (VI=80, viscosity SUS at 100° F.=150), balance.

Composition D

Mannitan monostearate, 2% by weight; diisobutylphenoxy (ethoxy)₄ ethanol, 1% by weight; 2,6-ditert-butyl-4-methylphenol, 0.2% by weight; phenyl-alpha-naphthylamine, 0.1% by weight; carbon black, 0.4% by weight; hydroxypropylamine nitrite, 0.1% by weight; mineral lubricating oil (same as A), balance.

Composition E

Sorbitan monooleate, 2% by weight; diisobutylphenoxy(propoxy)₂ propanol, 1% by weight; 2,6-ditert-butyl-4-methylphenol, 0.2% by weight; phenyl-alpha-naphthylamine, 0.1% by weight; lamp black, 0.5% by weight; dibenzyl disulfide, 0.1% by weight; $NaNO_2$, 0.1% by weight, mineral lubricating oil (same as A) balance.

Other finished water-in-oil emulsion (Composition I) were prepared by admixing 60% of oil base of Composition B with 40% water containing 0.1% $NaNO_2$ and hydroxypropylamine nitrite. The two phases were emulsified by passing them through a colloid mill until a stable homogeneous water-in-oil emulsion was formed.

Still other finished compositions include:

Composition II

| | Percent |
|---|---|
| Water | 30 |
| Composition C | 70 |

Composition III

| | |
|---|---|
| Water containing 0.1% Ca acetate | 40 |
| Composition D | 60 |

Composition IV

| | |
|---|---|
| Water containing 0.1% $NaNO_2$ | 35 |
| Composition E | 65 |

Composition V

| | |
|---|---|
| Water containing 0.1% hydroxy propylamine nitrite | 40 |
| Composition D | 60 |

Compositions A and B are excellent mold lubricants in the manufacture of shaped glass articles such as bottles, lamps, blown ware and as parting lubricants as well as affording excellent protection against rusting and wear of the equipment and machine used in shaping molten glass.

We claim as our invention:

1. A water-in-oil emulsion glass lubricant which is from about 20% to about 45% water phase and from about 55% to about 80% oil phase, the oil phase being essentially an 80–100 VI mineral oil having a viscosity of from 40 to 100 SUS at 100° F., containing from about 1.5% to about 3% of a monoester of a fatty acid having from 12 to 18 carbon atoms and sorbitan from about 1% to about 2% of an oil-soluble $C_{4-12}$ alkyl phenoxy(ethoxy)₄₋₆ ethanol and from about 0.001% to about 2% each of graphite and an alkali metal nitrite based on the oil.

2. A water-in-oil emulsion glass lubricant which is from about 20% to about 45% water phase and from about 55% to about 80% oil phase, the oil phase being essentially an 80–100 VI mineral lubricating oil having a viscosity of from 40 to 100 SUS at 100° F. containing from about 1.5% to about 3% of a sobitan monooleate from about 1% to about 2% of an $C_{4-12}$ alkyl phenoxy-(ethoxy)₄₋₆ ethanol and from about 0.001% to about 1% each of graphite and alkali metal nitrite based on the oil.

3. The lubricant composition of claim 1 containing in the emulsion from 0.01% to 2% of the oil-soluble antioxidant selected from the group consisting of oil-soluble polyalkyl phenol and naphthylamine compounds and mixtures thereof.

4. The lubricant composition of claim 2 containing in the emulsion from 0.01% to 2% of an oil-soluble antioxidant selected from the group consisting of oil-soluble polyalkyl phenol and naphthylamine compounds and mixtures thereof.

5. A water-in-oil emulsion glass lubricant which is from about 30% to about 40% water phase and from about 70% to about 60% oil phase, the oil phase being essentially a 80–100 VI mineral lubricating oil having a viscosity of from 40 to 100 SUS at 100° F. containing from about 1.5% to about 3% of sorbitan monooleate, from about 1% to about 2% of an oil-soluble diisobutyl phenoxy (ethoxy)₄ ethanol from about 0.01% to 1% each of graphite and sodium nitrite based on the oil.

6. The lubricant of claim 5 containing in the emulsions from about 0.01% to about 1% each of an oil-soluble dialkylphenol and an oil-soluble naphthylamine.

7. The lubricant composition of claim 5 containing in the emulsion from about 0.01% to about 1% each of 2,6-ditert-butyl-4-methylphenol and phenyl-alpha-naphthylamine.

8. An emulsifiable mineral oil concentrate capable of forming stable water-in-oil emulsions, the concentrate comprising a major amount of an 80–100 VI mineral oil having a viscosity of from 40 to 100 SUS at 100° F. containing from about 1.5% to about 3% of a monoester of a fatty acid having from 12 to 18 carbon atoms and a sorbitan and from about 1% to about 2% based on the oil of an oil-soluble $C_{4-12}$ alkyl phenoxy(ethoxy)₄₋₆ ethanol and from about 0.01% to about 1% each of graphite and an alkali metal nitrite.

9. An emulsifiable mineral oil concentrate capable of forming stable water-in-oil emulsions, the concentrate comprising a major amount of an 80–100 VI mineral lubricating oil having a viscosity of from 40 to 100 SUS at 100° F. containing 2% sorbitan monooleate, 1% diisobutyl phenoxy(ethoxy)₄₋₆ ethanol, 0.7% graphite and 0.1% sodium nitrite.

10. The mineral oil composition of claim 9 containing from about 0.01% to about 1% each of an oil-soluble dialkyl phenol and an oil-soluble naphthylamine.

11. The mineral oil composition of claim 9 containing from about 0.01% to about 1% each of 2,6-ditert-butyl-4-methylphenol and phenyl-alpha-naphthylamine.

References Cited in the file of this patent

UNITED STATES PATENTS

| | | |
|---|---|---|
| 1,428,148 | DeCew | Sept. 5, 1922 |
| 2,400,001 | Grupelli | May 7, 1946 |
| 2,777,819 | Williams et al. | Jan. 15, 1957 |
| 2,921,902 | Watson | Jan. 19, 1960 |
| 2,932,576 | Vierk et al. | Apr. 12, 1960 |
| 2,977,237 | Vierk et al. | Mar. 28, 1961 |

FOREIGN PATENTS

| | | |
|---|---|---|
| 540,034 | Canada | Apr. 23, 1957 |
| 551,920 | Canada | Jan. 21, 1958 |

OTHER REFERENCES

Atlas Surface Active Agents, Atlas Powder Co., Wilmington, Del., 1951, pages 19, 22 and 26–27.